United States Patent [19]

Piccirilli et al.

[11] 4,419,407

[45] Dec. 6, 1983

[54] ELASTOMERIC COATING COMPOSITIONS

[75] Inventors: Robert M. Piccirilli, Pittsburgh; Wen-Hsuan Chang, Gibsonia; Samuel Porter, Jr., Natrona Heights; James B. O'Dwyer, Gibsonia, all of Pa.; Kyu-Wang Lee, Danville, Calif.

[73] Assignee: PPG Industries, Inc., Pittsburgh, Pa.

[21] Appl. No.: 343,785

[22] Filed: Jan. 29, 1982

[51] Int. Cl.³ .............................................. B32B 27/40
[52] U.S. Cl. ................................ 428/423.1; 525/440; 525/443; 525/454
[58] Field of Search ....................... 525/440, 443, 454; 428/423.1

[56] References Cited

U.S. PATENT DOCUMENTS

| | | | |
|---|---|---|---|
| 2,720,500 | 10/1955 | Cody | 260/47 |
| 2,734,876 | 2/1956 | Bradley | 260/16 |
| 2,967,840 | 1/1961 | Phillips et al. | 260/22 |
| 3,464,938 | 9/1969 | Nordstrom | 260/21 |
| 3,477,976 | 11/1969 | Nakamuro et al. | 260/22 |
| 3,535,287 | 10/1970 | Wynstra | 260/75 |
| 3,624,232 | 11/1971 | Van Dorp et al. | 117/21 |
| 3,668,275 | 6/1972 | Riemhofer et al. | 260/850 |
| 3,668,276 | 6/1972 | Riemhofer et al. | 260/850 |
| 3,668,277 | 6/1972 | Riemhofer et al. | 260/850 |
| 3,678,128 | 7/1972 | Riemhofer et al. | 260/850 |
| 3,691,258 | 9/1972 | Riemhofer et al. | 260/850 |
| 3,819,757 | 6/1974 | Dorffel et al. | 260/850 |
| 3,852,375 | 12/1974 | Blethan et al. | 260/850 |
| 3,907,736 | 9/1975 | Barton et al. | 260/29.4 R |
| 3,912,790 | 10/1975 | Chang et al. | 260/849 |
| 3,928,265 | 12/1975 | Dhein et al. | 260/21 |
| 3,957,709 | 5/1976 | Holzrichter et al. | 260/29.4 R |
| 3,962,522 | 6/1976 | Chang et al. | 428/423 |
| 3,994,851 | 11/1976 | Chang | 260/29.4 R |
| 4,025,474 | 5/1977 | Porter, Jr. et al. | 260/22 CQ |
| 4,054,614 | 10/1977 | Hoffmann | 260/850 |
| 4,088,619 | 5/1978 | Holzrichter | 260/29.4 R |
| 4,093,675 | 6/1978 | Schure et al. | 260/835 |
| 4,101,603 | 7/1978 | Smith et al. | 260/850 |
| 4,104,240 | 8/1978 | Buter | 260/39 P |
| 4,113,793 | 9/1978 | Sekmakas | 260/850 |
| 4,154,891 | 5/1979 | Porter, Jr. et al. | 428/334 |
| 4,158,652 | 6/1979 | Koleske et al. | 260/29.4 UA |
| 4,165,307 | 8/1979 | Mizuno et al. | 525/440 |
| 4,169,825 | 10/1979 | Yapp et al. | 525/440 |
| 4,204,014 | 5/1980 | Dorffel et al. | 427/385.5 |

FOREIGN PATENT DOCUMENTS 1477008  6/1977  United Kingdom .

OTHER PUBLICATIONS

U.S. Application Ser. No. 640,088, filed Dec. 12, 1975, now abandoned, of Chang et al.

*Primary Examiner*—Lewis T. Jacobs
*Attorney, Agent, or Firm*—William J. Uhl

[57] ABSTRACT

High solids thermosetting elastomeric coating compositions are disclosed. The resinous binder of the coating compositions is based on a hard polyester polyol containing cyclic moieties plasticized with a soft polyurethane polyol and cured with a curing agent capable of reacting with active hydrogens, for example, an aminoplast curing agent. The coating compositions are particularly useful on elastomeric substrates such as high density polyurethane foams, as well as on metal substrates such as steel and aluminum.

16 Claims, No Drawings

ELASTOMERIC COATING COMPOSITIONS

BACKGROUND OF THE INVENTION

1. Field of the the Invention

The invention relates to thermosetting resinous coating compositions, particularly to elastomeric coating compositions, and more particularly, to high solids elastomeric coating compositions.

2. Brief Description of the Prior Art

Elastomeric coating compositions are those which have excellent flexibility, particularly at low temperature, along with good hardness and durability. Such coating compositions are particularly useful on elastomeric parts of automobiles and trucks such as bumpers, front end hood sections and the side moldings.

Examples of elastomeric coating compositions are shown in U.S. Pat. No. 3,962,522. These coating compositions are based on polyesterurethane polyols cured with aminoplast. Another example of an elastomeric coating composition is that disclosed in U.S. Pat. No. 4,154,891. These coating compositions are based on polymeric polyols such as soft polyurethane polyols cured with a stoichiometric excess of an aminoplast curing agent.

U.K. Pat. No. 1,477,008 discloses coating compositions comprising thermosetting resins, for example, hard polyester polyols, soft polyurethane polyols and aminoplast curing agents.

The coating compositions of the aforementioned patents are not high resin solids type, that is, they are not sprayable at high resin solids content. This is a disadvantage in that more coating applications are required to get the desired coating thickness and appearance. Also, future air pollution standards will require a reduction of organic solvent emissions of today's organic solvent-based coating compositions. Therefore, the coating compositions described in the aforementioned patents may not be environmentally acceptable in the future.

CROSS-REFERENCE TO RELATED APPLICATION

Application Ser. No. 343,784, filed even date herewith, relates to thermosetting coating compositions based on a hard polyester polyol containing cyclic moieties plasticized with a blend of soft polyurethane polyols, one of which has a high molecular weight and one of which has a low molecular weight, and cured with a curing agent such as an aminoplast.

Application Ser. No. 344,082, filed even date herewith, relates to thermosetting elastomeric coating compositions. The resinous binder of the coating compositions is based on a hard polyester polyol containing cycloaliphatic moieties plasticized with a soft polyurethane polyol and cured with a curing agent such as an aminoplast.

SUMMARY OF THE INVENTION

In accordance with the present invention, thermosetting, elastomeric coating compositions are provided. The coating compositions are sprayable at resin solids content of at least 40 percent by weight and are flexible such that when the coating composition is deposited on an elastomeric substrate and cured, the coated elastomeric substrate can be bent around a ¼-inch mandrel with the coating facing outwardly and the coating exhibits no breaks or cracks when tested at 70°–75° F. The film-forming constituents of the coating composition comprise:

(A) a hard polyester polyol having at least 20 percent by weight cyclic moieties and the percentage of cyclic moieties being not greater than that required to achieve the above-mentioned flexibility at 70°–75° F.; having a hydroxyl value of at least 80 and the hydroxyl value being not greater than that required to achieve the above-mentioned flexibility at 70°–75° F.; a molecular weight of 300 or greater but not greater than that required for formulating the coating composition with a sprayability of at least 40 percent by weight; and a Sward Hardness value of at least 15, (B) a polyurethane polyol having a molecular weight of 2,000 or greater but not greater than that required for formulating the coating composition with a sprayability of at least 40 percent by weight, and a Sward Hardness value of less than 10, and (C) a curing agent capable of reacting with the active hydrogens in (A) and (B) to form a crosslinked coating selected from the class consisting of aminoplast and polyisocyanates;

the difference in Sward Hardness values between (A) and (B) being greater than 10; the ratio of (A)+(B):(C) being within the range of 5 to 0.5:1, the weight ratio of (A)+(C):(B) being within the range of 100 to 1:1.

DETAILED DESCRIPTION

The coating compositions of the present invention are characterized as being thermosetting, liquid and elastomeric in nature. By "thermosetting" is meant the coating composition, upon heating, will solidify or set to form a coating which will not remelt on further heating.

By "liquid" is meant the composition is free flowing and not a solid or a gas.

The elastomeric behavior of the coating compositions of the present invention can be determined by measuring the tensile strength, elongation and flexibility of the coating, particularly the low temperature flexibility of the coating over an elastomeric substrate. The tensile strength and percent elongation of the coatings is determined according to ASTM D-639-72 on free films of the cured resinous ingredients. Accordingly, coatings deposited from the resinous components of the present invention have tensile strengths within the range of 2000 to 10,000 psi, elongations of at least 25, preferably at least 40, and most preferably from 75 to 200 percent.

The flexibility of the coatings can be determined by coating an elastomeric substrate such as ⅛ inch thick thermoplastic polyurethane commercially available from Mobay Company as TEXIN 3202 and bending the coated substrate around a ¼ inch diameter (1.13 cm) mandrel with the coating side outwardly facing. After bending, the coating is examined for breaks and cracks. Testing can be conducted at room temperature, i.e., 70°–75° F., or at low temperature, i.e., cooling substrate to 32° F. or even 0° F., before bending. When formulated for automotive use on elastomeric parts, the coatings of the present invention exhibit no breaks or cracks when tested at 70°–75° F. and 32° F. in the above-described manner, and preferably exhibit no breaks or cracks when tested at 0° F.

The hardness of the coating can be determined by the Sward method using a Sward rocker as described in ORGANIC COATINGS TECHNOLOGY, Payne, Vol. 1, 1965, pages 642–643. Cured coatings of the present invention usually have a Sward hardness within the range of 4 to 40, preferably 10 to 40, and more preferably 15 to 40.

For outdoor use of such elastomeric coatings for automobiles, the exterior durability of the coatings is important. The durability of the coating can be determined by exposing the coated substrates in Florida. The gloss of the substrate is measured immediately prior to testing and then after 3 months, 6 months and 9 months exposure. Accordingly, with coating compositions of the present invention properly formulated for outdoor exposure with U.V. light stabilizers, anti-oxidants, etc., the loss of gloss should be no more than about 10 percent of the initial value after exposure for 3 months, no more than 20 percent after 6 months, and no more than 60 percent after 9 months.

The hydrolytic stability can also be determined by measuring the humidity resistance of the coating. Humidity resistance of the coating can be determined by using a coated metal substrate as the ceiling of a humidity chamber (QCT chamber) with the coating directed inwardly towards the chamber. The chamber is heated to 100° F. (38° C.) and about a 2 inch (9 cm) level of water is located 3 to 5 inches below the coated panel (panel sloped). The coatings of the present invention, after being subjected to these conditions for 240 hours, show no blistering nor loss of gloss.

The coating compositions of the present invention are of the high solids type. By high solids is meant the coating composition is sprayable at a resin solids content of at least 40 percent, preferably at least 45 percent, and usually within the range of 45 to 65 percent by weight.

The sprayability is the maximum concentration of the resin solids in solution such that the resin can be atomized sufficiently to form a uniformly deposited coating. Above the maximum concentration, the spraying solution strings and gives a web-like spray pattern. The sprayability of the resin solids is determined by first dissolving the resin in a suitable solvent such as N-methyl pyrrolidone to a viscosity of about 500 to 1000 centipoises measured at 78° F. and then thinning with a mixture of 2 parts methyl ethyl ketone, 2 parts of n-butanol and 1 part of 2-ethoxyethylacetate (all parts by volume) to the maximum spray solids. The sprayability is then determined on the thinned solutions using a spray gun such as an air suction spray gun operating at 60 psi with a No. 30 air cap.

As mentioned above, the coating compositions of the present invention comprise 3 principal resinous components: a polyester polyol, a polyurethane polyol and a curing agent.

The polyester polyol component of the coating composition contains at least 10 percent, preferably at least 20 percent, more preferably at least 25 percent and most preferably from 25 to 40 percent by weight cyclic moieties. The percentage by weight of cyclic moieties is determined by taking the weight of the ingredients which contain cyclic moieties used in preparing the polyester divided by the total weight of reactive ingredients. Cyclic moieties contribute hardness and durability to the cured coatings. Polyesters containing less than 10 percent by weight cyclic moieties are undesirable because the coatings will have insufficient hardness and durability for elastomeric use. The upper limit of cyclic moieties is preferably less than 70 percent. Polyesters containing greater than 70 percent by weight cyclic moieties are not preferred because of insufficient flexibility in the resultant coating. Preferably, the cyclic moieties are cycloaliphatic because they give a better combination of flexibility and hardness than other cyclic moieties such as aromatic moieties.

The hydroxyl value of the polyester polyol should be at least 80, preferably at least 120, and more preferably at least 200. The hydroxyl value is based on resin solids and determined according to ASTM E-222-76, Method B (reflux 1 hour). The high hydroxyl value of the polyester polyol is important because it contributes to hardness and toughness of the cured film. Also, high hydroxyl values are necessary to formulate high solids compositions. Hydroxyl values less than 80 are undesirable because of the difficulty in formulating high solids compositions. The upper limit of the hydroxyl value is preferably less than 350. Polyesters having hydroxyl values greater than 350 are not preferred because of poor flexibility in the resultant coating.

The polyester polyol used in the practice of the present invention should have a Sward Hardness value greater than 15, usually 15 to 50, preferably 20 to 40.

The Sward Hardness value is a measure of hardness; the higher the value, the harder the polyol as determined with a cured film of the polyol. The Sward Hardness value is the Sward Hardness of a cured film of the polyol. The cured film has a thickness of 3 mils ±0.5 mils. The polyol is cured by the following method: The polyol on which the hardness is to be measured is mixed with 160 grams of hexakis(methoxymethyl)melamine per 1 gram equivalent of polyol and 0.5 percent by weight based on total solids of para-toluenesulfonic acid. The mixture is drawn down over a steel substrate with a draw bar (i.e., 6 mil draw bar), and cured at 300° F. (149° C.) for 30 minutes. The Sward Hardness of the cured film is determined and reported as the Sward Hardness value of the polyol.

Polyesters with Sward Hardness values less than 15 are undesirable because the resultant cured coating will have insufficient durability and hardness. Polyesters having Sward Hardness values greater than 50 are lesspreferred because the resultant coatings have less than optimum flexibility at low temperature.

The polyester polyol is prepared by polyesterification of an organic polycarboxylic acid or a functional equivalent thereof such as an anhydride or a lower alkyl ester with an organic polyol and/or an epoxide. The cyclic moieties can be incorporated into the polyester either from the organic polycarboxylic acid component or the organic polyol component or from both. Examples of suitable cyclic polycarboxylic acids or their functional equivalents thereof are phthalic anhydride, tetrahydrophthalic anhydride, hexahydrophthalic anhydride and dimethylcyclohexane dicarboxylate; with the latter two being preferred. Examples of suitable cyclic organic polyols are bisphenol A, hydrogenated bisphenol A, cyclohexanediol and cyclohexanedimethanol.

Besides the cyclic polycarboxylic acids or their functional equivalents thereof, acyclic polycarboxylic acids containing from about 2 to 18 carbon atoms may also be used. Examples include succinic acid, glutaric acid, adipic acid, suberic acid and sebacic acid. Further, mixtures of cyclic polycarboxylic acids with acyclic polycarboxylic acids can be used.

Besides the cyclic polyols mentioned above, acyclic polyols containing from 2 to 12 carbon atoms can be used. Examples include 1,2 -butanediol, 1,4-butanediol, neopentyl glycol and 1, 6-hexanediol. Also, mixtures of cyclic polyols and acyclic polyols can be used.

Preferably, the polyol component will contain neopentyl groups such as the aforementioned neopentyl glycol and 2,2-dimethyl-3-hydroxypropyl 2,2-dimethyl-3-hydroxypropionate. Preferably, the polyester will contain from about 15 to 80, more preferably from about 40 to 70, percent by weight of such branched moieties, the percentage by weight being based on weight of the polyol which contains branching divided by the total weight of ingredients which are used in preparing the polyester polyol. Neopentyl groups are preferred because of better durability in the resultant coating.

The polycarboxylic acid and the polyol used in preparing the polyester are preferably difunctional. Use of higher functionality materials such as tricarboxylic acids or triols, although they can be used, are not preferred because they result in lower flexibility and higher resin viscosities, which are more difficult to process. Examples of polyfunctional materials would be trimellitic anhydride and trimethylolpropane.

Besides the organic polycarboxylic acids and polyols mentioned above, polyester polyols of the invention can be prepared with minor amounts, i.e., less than 30 percent by weight based on total weight of ingredients used in making the polyester of compounds containing both hydroxyl and carboxyl groups. Examples of such materials are dimethylolpropionicacid and 6-hydroxyhexanoic acid.

Also, amines or hydroxyl-containing amines can be used in preparation of the polyester polyols. The resultant polyester would be more accurately defined in this instance as a polyesteramide and polyesteramides are included within the definition of polyester polyols for the purposes of this invention. Examples of suitable polyamines or amino polyols are hexamethylenediamine and monoethanolamine.

In order to achieve the high resin solids contents and sprayabilities, the polyester polyol used in the practice of the invention preferably should have a molecular weight (on a number average basis) of 1000 or less, more preferably about 300 to 800. Using polyesters having molecular weights much higher than 1000 presents difficulties in formulating high solids compositions; whereas molecular weights less than 300 are not preferred because of relatively poor flexibility in the resultant coating.

Besides the polyester polyol described above, the film-forming compositions of the present invention also contain a polyurethane polyol having a Sward Hardness value determined as described above of less than 10, usually about 2 to 10, preferably 2 to 6. Sward Hardness values greater than 10 are undesirable because of insufficient flexibility in the resultant coating.

The polyurethane polyol is referred to as a plasticizer, however, it is a reactive material in that it, along with the polyester, participates in the curing with the curing agent.

Besides having Sward Hardness values as described above, the difference in Sward Hardness values of the polyester and polyurethane should be at least 10, preferably within the range of 10 to 40 inclusive, more preferably 20 to 40 inclusive, so as to provide for the best combination of durability, hardness and flexibility.

The polyurethane polyol is formed from reacting an organic polyisocyanate with a polymeric polyol or with a mixture of a polymeric polyol and optionally a low molecular weight polyol. The low molecular weight polyol, if used, will have a molecular weight less than 250, whereas the polymeric polyol will have a molecular weight greater than 500.

The organic polyisocyanate is reacted with the polyol so that the OH/NCO equivalent ratio is greater than 1:1 so that the resultant product contains free hydroxyl groups. Preferably, the polyurethane polyol will have a hydroxyl value calculated as described above of about 10 to 100, more preferably 30 to 70.

The organic polyisocyanate which is used in preparing the polyurethane polyols can be an aliphatic or an aromatic polyisocyanate or a mixture of the two. Aliphatic polyisocyanates (including cycloaliphatic polyisocyanates) are preferred because of better color stability in the resultant coating. Also, diisocyanates are preferred, although higher polyisocyanates such as triisocyanates can be used. However, their use does result in some chain branching which results in increased viscosity and difficulties in formulating the high solids coatings of the invention.

Examples of suitable diisocyanates are 4,4'-diphenylmethane diisocyanate, 1,4-tetramethylene diisocyanate, isophorone diisocyanate and 4,4'-methylene-bis-(cyclohexyl isocyanate). Examples of suitable higher functionality polyisocyanates are polymethylene polyphenyl isocyanates.

Examples of suitable polyols which can be used with the polyisocyanates are those having a molecular weight greater than 500 and these would include polyester polyols, which are preferred, polyether polyols and mixed polyester-polyether polyols. Examples of suitable polyester polyols are those prepared by reacting an organic polycarboxylic acid or its functional equivalent thereof such as an anhydride or a lower alkyl ester with an organic polyol and/or an epoxide such as described above.

Besides polyester polyols formed from polycarboxylic acids and polyols, polylactone-type polyesters can also be employed. These products are formed from reaction of a lactone such as epsilon-caprolactone and an active hydrogen-containing material such as a polyol. Such products are described in U.S. Pat. No. 3,169,945 to Hostettler, and the portion of this patent relating to the description of polycaprolactone polyols being incorporated by reference. While not disclosed in the aforementioned patent, the reaction product of a lactone with an acid-containing polyol such as described in U.S. Pat. No. 4,098,743 can also be used. Typically, the polyesters used will have a hydroxyl value of 50 to 250.

Besides the polyester polyols, polyether polyols can also be employed. Examples of polyether polyols are polyalkylene ether polyols which include those having the structural formula:

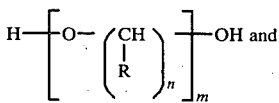

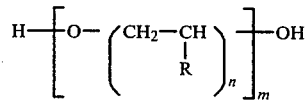

where the substituent R is hydrogen or lower alkyl containing from 1 to 5 carbon atoms including mixed substituents and n is typically from 2 to 6, and m is from 10 to 1000. Included are poly(oxytetramethylene) glycols, poly(oxyethylene) glycols, poly(oxy-1,2-propylene) glycols and the reaction product of ethylene glycol with a mixture of 1,2-propylene oxide and ethylene oxide.

Also useful are polyether polyols formed from oxyalkylation of various polyols, for example, glycols such as ethylene glycol, 1,6-hexanediol, bisphenol A and the like, or other higher polyols such as trimethylolpropane, pentaerythritol and the like. If these higher functionality polyols are used, however, they should be used in minor amounts so as to minimize chain branching and the resultant high viscosities which are obtained.

The polyurethane polyol described above preferably has a molecular weight of 20,000 or less, preferably from about 2,000 to 10,000, more preferably 5,000 to 8,000. The molecular weights are determined by gel permeation chromatography using a polystyrene standard. Therefore, it is not the actual molecular weight which is measured but an indication of the molecular weight compared to polystyrene. The values which are obtained are commonly referred to as polystyrene numbers. However, for the purposes of this application, they are referred to as molecular weights. Further, the molecular weights are the peak molecular weights as determined by the following method.

In measuring the peak molecular weight using the polystyrene as the standard, a Waters Associates gel permeation chromatograph Model 201 was used. Six $\mu$-Styragel colums were used. Each column has the dimensions of 30 centimeters long and 7.8 millimeters inside diameter. A differential refractometer was used as detector, and the columns were arranged according to their pore size on the order of $10^6$-$10^5$-$10^4$-$10^3$-500-100 Angstroms with the $10^3$ Angstrom colum being the first one. Tetrahydrofuran was used as a solvent with a flow rate of 2.0 milliliters/minute. The quality of the columns is checked by their "theoretical plate number" determined from ortho-dichlorobenzene and those columns with theoretical plate numbers greater than 3000/30 cm were used.

To determine molecular weight by gel permeation chromatography (GPC), the instrument is first calibrated using a polystyrene standard. Polystyrene standards used were purchased from Pressure Chemicals Company, Pittsburgh, Pa., and Waters Associates. The polystyrene standards have dispersities (dispersity=weight average molecular weight/number average molecular weight) ranging from 1.05 to 1.10. The weight average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 4,000 and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Gehman Corporation, Catalog No. 4219, a 0.5 ml sample size was injected into the columns and a GPC chromatogram obtained under the same experimental conditions as the calibration. The molecular weight which is reported is the peak molecular weight which is the polystyrene number in the molecular weight distribution curve at the peak. Where there is more than one peak, the highest peak is intended.

Molecular weights much higher than 10,000 are less preferred because of higher resin viscosities and the difficulties associated in formulating high solids coating compositions. Molecular weights less than 2,000 are less preferred because of insufficient toughness and flexibility in the resultant coating.

The polyol component described above is mixed with curing agent which is capable of reacting with the active hydrogens in the polyester and polyurethane polyol to give a thermoset coating. Examples of curing agents are aminoplasts, which are preferred, and polyisocyanate curing agents such as blocked isocyanates. These three ingredients, i.e., polyester polyol, polyurethane polyol and curing agent, provide the major resinous components of the coating compositions of the invention.

Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Bayer as DESMODUR N. The polyisocyanate may optionally be blocked. Examples of suitable blocking agents are those materials which would unblock at elevated temperatures such as low aliphatic alcohols such as methanol, oximes such as methyl ethyl ketone oxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application.

The amounts of polyester polyol, polyurethane polyol and curing agent which are used in the practice of the invention are preferably adjusted so that the ratio of polyester polyol plus polyurethane polyol: curing agent is within the range of 5 to 0.5:1, preferably 2 to 1:1. Preferably, the weight ratio of polyester polyol plus curing agent:polyurethane polyol is within the range of 100 to 1:1, preferably 9 to 1:1. Ratios of polyester polyol plus polyurethane polyol:curing agent greater than 5:1 are not preferred because hardness and durability of the resultant coating will suffer; whereas ratios less than 1:1 are not preferred because flexibility of the resultant coating will suffer. Ratios of polyester polyol plus curing agent:polyurethane polyol greater than 100:1 are not preferred because of relatively poor flexibility in the resultant coating; whereas ratios less than 1:1 are not preferred because the resultant coatings are relatively soft and lack toughness.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow, and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention are of the high solids type, a liquid diluent is usually present in the composition. By liquid diluent is meant a solvent or non-solvent which is volatile and is removed after the coating is applied and is needed to reduce viscosity sufficiently to enable forces available in simple coating techniques, namely, spraying, to spread the coating to controllable, desired and uniform thicknesses. Also, diluents assist in substrate wetting, resinous component compatibility, package stability and coalescence or film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, as well as compatible mixtures thereof. The diluent is present in amounts up to 60 percent by weight, usually 35 to 55 percent by weight, based on total weight of diluent and resin solids.

In addition to the above ingredients, various fillers, plasticizers, anti-oxidants, U.V. light absorbers, flow control agents, surfactants and other formulating additives can be employed if desired. These materials are optional and generally constitute up to 5 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings are particularly useful on resilient and rubbery substrates such as foam rubber, polyurethane foam and vinyl foam, and on soft metal surfaces such as mild steel and aluminum.

The combination of outstanding properties of the coating compositions of the present invention make them useful for a wide variety of applications. They can be used for coating automotive parts such as automobile bodies and truck cabs. Also, they can be used for other coating applications such as coatings for appliance parts such as refrigerators and washing machines, and they can also be used for coil coating applications.

In general, coating thickness will vary depending upon the application desired. In general, coatings from about 0.1 to 5 mils have been found to be useful in most applications.

After application to the substrate, the coatings are cured. Curing is usually conducted at temperatures of about 100° to 200° C., and in most cases, a cure schedule is from about 20 to 30 minutes at about 120 to 150° C. Higher or lower temperatures with correspondingly shorter or longer times can be utilized, although the exact cure schedule best employed depends upon the nature of the substrate as well as the particular components used in formulating the coating compositions. With aminoplast curing agent, acid catalysts can be employed, if desired, as they usually permit use of lower temperatures and shorter times for cure.

The coating compositions of the present invention can be applied to the substrate in a clear-over-color application in which a pigmented or colored base coat is first applied to a substrate, followed by application of a clear top coat. In both coatings, the resinous ingredients employed in the coating compositions of the present invention are used.

The following examples illustrate the invention. All quantities are on a weight basis unless otherwise indicated.

EXAMPLES

A series of hard polyester polyols were prepared as follows:

EXAMPLE A

A polyester (Sward Hardness value of 34, containing 42.5 percent cyclic moieties and MW=344) was prepared from the following mixture of ingredients:

| Ingredients | Parts by Weight (in grams) |
| --- | --- |
| Neopentyl glycol | 2255.8 |
| Hexahydrophthalic anhydride | 1744 |
| Butyl stannoic acid | 0.2 |
| Methyl amyl ketone | 435 |

The ingredients were charged to a reaction vessel and heated to reflux. Reaction was continued with water being removed until an acid value of about 7.3 was obtained. The reaction mixture was thinned with the methyl amyl ketone. The polyester resin had a theoretical solids content of 90 percent, an OH value of 321 (100 percent resin solids) and an acid value of 8.27.

EXAMPLE B

A polyester (Sward Hardness value of 24, containing 27.4 percent cyclic moieties and MW=544) was prepared as generally described in Example A from the following mixture of ingredients:

| Ingredients | Parts by Weight (in grams) |
| --- | --- |
| ESTER DIOL 204[1] | 435.6 |
| Hexahydrophthalic anhydride | 164.4 |
| Butyl stannoic acid | 0.05 |
| Methyl amyl ketone | 64.0 |

[1]2,2-Dimethyl-3-hydroxypropyl 2,2-dimethyl-3-hydroxypropionate available from Union Carbide Corp.

The polyester had a Gardner-Holdt letter viscosity of Z1, a solids content (105° C.) of 82.7 percent, acid value of 8.76 and a hydroxyl value of 188.6 (210 at 100 percent resin solids).

EXAMPLE C

A polyester (Sward Hardness value of 32, containing 38.8 percent cyclic moieties and MW=428) was prepared as generally described in Example A from the following mixture of ingredients:

| Ingredients | Parts by Weight (in grams) |
| --- | --- |
| Trimethylpentanediol | 2265 |
| Hexahydrophthalic anhydride | 1435 |
| Butyl stannoic acid | 0.2 |
| Methyl amyl ketone | 435 |

The polyester resin had a Gardner-Holdt letter viscosity of $Z^1$-$Z^2$, solids content (105° C.) of 75.7, acid value of 9.3 and OH value of 191.6 (213 at 100 percent resin solids).

EXAMPLE D

A polyester (Sward Hardness value of 40, containing 36.5 percent cyclic moieties and MW=404) was prepared as generally described in Example A from the following mixture of ingredients:

| Ingredients | Parts by Weight (in grams) |
| --- | --- |
| Trimethylolpropane | 2497 |
| Hexahydrophthalic anhydride | 1435 |
| Butyl stannoic acid | 0.2 |
| Methyl amyl ketone | 12.03 |

The polyester resin had a Gardner-Holdt letter viscosity of V-W, solids content (105° C.) of 60.3 percent, acid value of 6.5 and OH value of 404.1 (538.6 at 100 percent resin solids).

EXAMPLE E

A polyester (containing 100 percent cyclic moieties and MW=424) was prepared as generally described in Example A from the following mixture of ingredients:

| Ingredients | Parts by Weight (in grams) |
| --- | --- |
| Hexahydrophthalic anhydride | 935.0 |
| Cyclohexanedimethanol | 1559.0 |
| Butyl stannoic acid | 0.25 |
| Methyl amyl ketone | 422 |

The polyester resin had a Gardner-Holdt letter viscosity of Z3, a solids content (150° C.) of 86.9 percent, acid value of 10.9 and OH value of 98 (220 at 100 percent solids).

EXAMPLE F

A polyester (Sward Hardness value of 42, containing 74 percent cyclic moieties and MW=384) was prepared as generally described in Example A from the following mixture of ingredients:

| Ingredients | Parts by Weight (in grams) |
| --- | --- |
| Cyclohexanedimethanol | 537.1 |
| Hexahydrophthalic anhydride | 574.5 |
| Neopentyl glycol | 380.9 |
| Butyl stannoic acid | 0.15 |

The polyester (1286.9 grams) was thinned with 227 grams of methyl amyl ketone. The polyester resin had a resin solids content (105° C.) of 75.7 percent, Gardner-Holdt bubble viscosity of 29.6 seconds, acid number of 16.2 and hydroxyl value of 245.2 (288 at 100 percent resin solids).

EXAMPLE G

A polyester (Sward Hardness value of 32, containing 59.4 percent cyclic moieties and MW=484) was prepared as generally described in Example A from the following mixture of ingredients:

| Ingredients | Parts by Weight (in grams) |
| --- | --- |
| Cyclohexanedimethanol | 432.0 |
| Hexahydrophthalic anhydride | 462.0 |
| ESTER DIOL 204 | 612.0 |
| Butyl stannoic acid | 0.15 |

Ninety parts of polyester was thinned with 10 parts of methyl amyl ketone. The thinned polyester resin had a resin solids content (105° C.) of 78.5, a Gardner-Holdt viscosity of Z4, acid number of 10.4 and hydroxyl value of 203 (225.5 at 100 percent resin solids).

EXAMPLE H

A polyester (containing 62.8 percent cyclic moieties and MW=484) was prepared as generally described in Example A with the exception that the reaction was conducted at 200°-230° C. with the removal of 304 ml of methanol, from the following mixture of ingredients:

| Ingredients | Parts by Weight (in grams) |
| --- | --- |
| Cyclohexanedimethanol | 394.6 |
| Dimethylcyclohexane dicarboxylate | 548.0 |
| ESTER DIOL 204 | 559.0 |
| Butyl stannoic acid | 0.15 |

The polyester was thinned with methyl amyl ketone to an 85 percent total theoretical solids. The thinned resin has a resin solids content (105° C.) of 80.7 percent, a Gardner-Holdt viscosity of Z-Z1, and OH number of 93.4 (109.9 at 100 percent resin solids).

EXAMPLE J

A polyester-propylene oxide adduct (Sward Hardness value of 40, containing 44.5 percent cyclic moieties and MW=346) was prepared as follows:

A hexahydrophthalic anhydride-trimethylolpropane polyester polyol intermediate was first prepared from the following mixture of ingredients:

| Ingredients | Parts by Weight (in grams) |
| --- | --- |
| Hexahydrophthalic anhydride | 5347 |
| Trimethylolpropane | 4653 |
| Butyl stannoic acid | 10 |

The hexahydrophthalic anhydride was charged to a reaction vessel at 70°–80° C., followed by the addition of the trimethylolpropane. The temperature of the reaction mixture was raised to 120° C. and the catalyst added. The reaction mixture began to reflux and was held at reflux for 30 minutes and was then cooled to 120° C. and held for one hour until an acid value of 182.7 was obtained.

A propylene oxide reaction product of the polyester polyol was prepared from the following mixture of ingredients:

| Ingredients | Parts by Weight (in grams) |
| --- | --- |
| Polyester polyol intermediate prepared as described above | 1069 |
| Propylene oxide | 400 |
| HYAMINE 10X[1] | 5 |

[1]Diisobutylcresoxyethoxyethyl dimethylbenzyl ammonium chloride monohydrate available from Rohm and Haas Company.

The polyester polyol was charged to a reaction vessel and heated to 130° C. Propylene oxide (203 grams) was added slowly to the reaction vessel over the period of about 19-½ hours. The HYAMINE 10X was added and the remaining portion of the propylene oxide added. The reaction mixture began to reflux and was held at 120° C. for 5 hours. The reaction mixture was thinned with 163 parts of methyl amyl ketone. The polyester resin had a resin solids content (105° C.) of 88.1, a Gardner-Holdt letter viscosity of $Z^{4+}$, acid value of 0.5 and hydroxyl value of 352.6 (391.5 at 100 percent resin solids).

EXAMPLE K

A polyester (Sward Hardness value of 28, containing 39.3 percent cyclic moieties and MW=374), similar to Example J, was prepared from the following mixture of ingredients:

| Ingredients | Parts by Weight (in grams) |
| --- | --- |
| Polyester polyol intermediate of Example J | 1152 |
| Neopentyl glycol | 416 |

The polyester polyol and neopentyl glycol were charged to a reaction vessel and heated to 120° C. to initiate reflux. Refluxing conditions were continued with water being removed for about 6 hours. The resulting polyester was cooled and thinned with 167 grams of methyl amyl ketone. The polyester resin had a resin solids content (105° C.) of 81.7, a Gardner-Holdt letter viscosity of $Z^{7-}$, acid value of 9.0 and hydroxyl value of 387.0 (430 at 100 percent resin solids).

EXAMPLE L

A polyester (containing 35.5 percent by weight cyclic moieties and MW=416) was prepared as generally described in Example K from the following mixture of ingredients:

| Ingredients | Parts by Weight (in grams) |
| --- | --- |
| Polyester polyol intermediate of Example J | 1152 |
| Trimethylpentanediol | 584 |
| Butyl stannoic acid | 1.7 |
| Methyl amyl ketone | 181 |

The polyester resin had a resin solids content (105° C.) of 77.7 percent, a Gardner-Holdt letter viscosity of $Z^{6+}$, acid value of 8.2 and OH number of 321.5 (357.2 at 100 percent resin solids).

EXAMPLE M

A polyester (containing 70 percent by weight cyclic moieties and MW=434) was prepared as generally described in Example K from the following mixture of ingredients:

| Ingredients | Parts by Weight (in grams) |
| --- | --- |
| Polyester polyol intermediate of Example J | 1152 |
| Cyclohexanedimethanol | 576 |
| Methyl amyl ketone | 185 |

The polyester resin had a resin solids content (105° C.) of 85.7, a Gardner-Holdt letter viscosity of $Z^7$-$Z^8$, acid value of 7.7 and hydroxyl value of 352.1 (391 at 100 percent resin solids).

EXAMPLE N

A polyester (containing 68.8 percent by weight cyclic moieties and MW=436) was prepared as generally described in Example H (242 ml methanol removed), from the following mixture of ingredients:

| Ingredients | Parts by Weight (in grams) |
| --- | --- |
| Cyclohexanedimethanol | 432.0 |
| Dimethylcyclohexane dicarboxylate | 600.0 |

-continued

| Ingredients | Parts by Weight (in grams) |
| --- | --- |
| ESTER DIOL 204 | 306.0 |
| Neopentyl glycol | 156.0 |
| Butyl stannoic acid | 0.15 |

The polyester was thinned with methyl amyl ketone to 90 percent total theoretical solids. The polyester resin had a resin solids content (105° C.) of 78.8, a Gardner-Holdt viscosity of Z2-Z3 and a hydroxyl value of 199.8 (222 at 100 percent resin solids).

Polyurethane Polyols

EXAMPLE O

A poly(ester-urethane) polyol (Sward Hardness value of 2 and MW=19,000) was prepared from the following mixture of ingredients:

| Ingredients | Parts by Weight (in grams) |
| --- | --- |
| Polycaprolactone polyol (MW = 1250) | 39.26 |
| Dimethylolpropionic acid | 1.19 |
| DESMODUR W[1] | 9.56 |
| Methyl isobutyl ketone | 18.29 |
| Methyl ethyl ketone | 31.46 |
| Monoethanolamine | 0.23 |

[1]4,4'-methylene-bis-(cyclohexyl isocyanate) obtained from Mobay Company.

The methyl isobutyl ketone, PCP-0230, dimethylolpropionic acid and DESMODUR W were charged to a reaction vessel under a nitrogen atmosphere and heated to 110° C. until a Gardner-Holdt bubble viscosity of 12.9 seconds was reached. The viscosity was measured by taking a sample of the resin and thinning with 46 parts of methyl ethyl ketone per 100 parts of resin. After the required viscosity was obtained, the monoethanolamine was then added, followed by the addition of the methyl ethyl ketone. The reaction product had a resin solids content (150° C.) of about 49.8 percent, a Gardner-Holdt letter viscosity of B+, an acid value of 9.8 based on resin solids and a hydroxyl number of 18.8 (37.6 at 100 percent resin solids).

EXAMPLE P

A poly(ester-urethane) polyol (Sward Hardness value of 4 and MW=6336) was prepared by charging the following mixture of ingredients to a reactor and heating to 120° C. until infrared spectra showed little or no evidence of epsilon-caprolactone:

| Ingredients | Parts by Weight (in grams) |
| --- | --- |
| Dimethylolpropionic acid | 33.2 |
| Diethylene glycol | 397.6 |
| Epsilon-caprolactone | 2889.2 |

The reaction mixture was cooled to 60° C. and 2650 grams poured into another reactor. Isophorone diisocyanate (555 grams) was added and the mixture thinned to 90 percent resin solids with methyl isobutyl ketone. The reaction mixture was heated to exotherm and held at 110° C. for 3 hours. An IR spectrum showed no evidence of isocyanate groups. The resin had a resin solids content (150° C.) of 86.9 percent, a Gardner-Holdt bubble viscosity of 23.9 seconds, an acid value of 6.4, a hydroxyl number of 59.6 (66.2 at 100 percent resin solids). For use in paints described in Example 14, the resin was further thinned to 70 percent solids in 2-ethoxyethylacetate. For Example 15, the resin was used at 100 percent solids.

EXAMPLE Q

A poly(ester-urethane) polyol (Sward Hardness value of 4 and molecular weight=6597) was prepared from the following: 33.2 grams of dimethylolpropionic acid, 397.7 grams of diethylene glycol, 2889.1 grams of epsilon-caprolactone and 3.3 grams of triphenylphosphine. The ingredients were charged to a reaction vessel under a nitrogen blanket and heated to about 150° C. and held at this temperature until an IR spectra indicated the absence of epsilon-caprolactone.

The reaction mixture described above (2490.0 grams) was charged to a reaction vessel with 275.1 grams of DESMODUR W and 152 grams of methyl isobutyl ketone.

Additional DESMODUR W (96.7 grams) was added to 2417 grams of the reaction mixture and the reaction mixture heated to about 110° C. until a Gardner-Holdt viscosity of 158 seconds was obtained. The reaction was terminated, and an IR spectra indicated a small amount of NCO. The reaction mixture was heated to 40° C. until an IR spectra indicated the absence of NCO. The reaction mixture was thinned to 90 percent resin solids with methyl isobutyl ketone. The reaction mixture had an acid value of 4.7, a hydroxyl value of 54.2 and a Gardner-Holdt viscosity of Z2-Z4.

Paints

A first series of paints was formulated using the polyesters and the polyurethane as described above. The polyester and polyurethane were formulated with an aminoplast curing agent, a catalyst, poly(oxytetramethylene) glycol plasticizer, a flow control agent and a pigment paste as shown in Table I below:

TABLE I

| Paint Formulation | | |
| --- | --- | --- |
| Ingredients | Parts by Weight, solids (in grams) | |
| Polyester polyols as shown in Table II | 34 | (39 parts for Example 3) |
| Polyurethane polyol of Example O | 5 | |
| CYMEL 303[1] | 40 | |
| TERACOL 1000[2] | 10 | (5 parts for Example 3) |
| Flow control agent[3] | 7 | |
| Catalyst[4] | 0.75 | |
| TINUVIN 328[4a] | 2.00 | |
| Pigment paste[5] | 15 | |

[1]Hexakis(methoxymethylol)melamine commercially available from American Cyanamid Company.
[2]Poly(oxytetramethylene) glycol having a molecular weight of about 1000 commercially available from E. I. duPont de Nemours and Co.
[3]Polymeric microparticles prepared in accordance with Example II of U.S. Pat. No. 4,147,688.
[4]A 40 percent by weight para-toluenesulfonic acid solution in isopropanol.
[4a]U.V. light stabilizer, substituted benzotriazole, commercially available from Ciba-Geigy Company.
[5]Pigment paste contained aluminum pigment, phthalo blue, irgazin blue and carbon black in an iminized polyester pigment grinding vehicle.

The paints formulated as described above had a sprayable resin solids content of about 55–58 percent by weight. The weight ratio of polyester polyol plus polyurethane polyol:aminoplast was about 1:1. The weight ratio of polyester polyol plus aminoplast:polyurethane polyol was about 15:1.

The paints were sprayed onto ⅛ inch thick RIM thermoplastic polyurethane substrates commercially available from Ford Utica as UTICA 114. The coatings were cured at 124° C. for 30 minutes to give a 1.8 mil thick cured coating.

The coated substrates were evaluated for initial gloss, hardness and elasticity, and for gloss retention and dirt pick up after 3, 6 and 9 months of Florida exposure. The results are presented in Table II below:

urethane polyol:aminoplast was about 1.2:1, and the weight ratio of polyester polyol plus aminoplast-polyurethane polyol ranged from 1.2–2.6:1.

The paints were sprayed onto RIM BAYFLEX thermoplastic polyurethane substrates commercially available from Mobay Corporation. The coatings were cured at 124° C. for 30 minutes to give 1.8 mil thick cured coatings. The cured substrates were evaluated for Sward hardness, elasticity and humidity resistance. The

TABLE II

| | | | Coating Properties | | | 60° Gloss[4] and Dirt Pick Up[5] | | |
|---|---|---|---|---|---|---|---|---|
| | | | Initial Properties | | | After Florida Exposure For | | |
| Example | Polyester | 20° Gloss[1] | Sward Hardness | 0° F. Bend[3] | 75° F. Bend[3] | 3 Months | 6 Months | 9 Months |
| 1 | A | 40 | 22 | Pass | Pass | 68/10 | 62/10 | 32/10 |
| 11 2[6] | B | 35 | 8 | Fail | Pass | 73/10 | 60/10 | 51/10 |
| 3 | C | 30 | 22 | Pass | Pass | 73/10 | 57/9 | 51/9 |
| 4 | H | 35 | 6 | Pass | Pass | 65/10 | 50/9 | 36/9 |
| 5 | N | 45 | 16 | Fail | Pass | 71/10 | 51/10 | 40/10 |

[1]20° gloss is measured with a Gardner 20° Gloss Meter manufactured by Gardner Instruments.
[2]Sward hardness is measured using a Sward rocker as described in ORGANIC COATINGS TECHNOLOGY, Payne, Vol. 1, 1965, pages 642–643.
[3]Bend is a 180° bend of the coated substrate, at the temperature indicated with coating side facing outwardly, around a ½ inch (1.13 cm) mandrel. After bending, the coating is examined for breaks and cracks. A rating of pass indicates no break or crack. Fail indicates breaks and cracks.
[4]60° gloss is measured with a Gardner 60° Gloss Meter manufactured by Gardner Instruments.
[5]Ratings for Dirt Pickup range from 1 to 10 with 10 indicating essentially no dirt pick up and 1 indicating much dirt pick up.
[6]Paint contained 5 parts by weight TERACOL 1000 instead of parts by weight used in the other paints.

A second series of paints was formulated using the polyesters and polyurethanes described above. The polyester and polyurethane were formulated with an aminoplast curing agent, catalyst, flow control agent, and a pigment paste as shown in TABLE III below:

TABLE III

| Paint Formulation | |
|---|---|
| Ingredients | Parts by Weight, solids (in grams) |
| Polyester polyol as identified in Table IV | 8–25 as shown in Table IV |
| Polyurethane polyol as identified in Table IV | 25–40 as shown in Table IV |
| CYMEL 303 | 40 |
| Flow control agent[1] | 5 |
| Catalyst[1] | 0.5 |
| Pigment paste[2] | 4.0 |
| Cellulose acetate butyrate[3] | 1.0 |
| Methyl amyl ketone | 55.0 |

[1]Identified in Table I.
[2]Pigment paste containing aluminum pigment and phthalo blue in an iminized polyester pigment grinding vehicle.
[3]25 percent by weight solution of cellulose acetate butyrate in 75/25 (by volume) methyl isobutyl ketone/1-butanol.

The paints formulated as described above had a sprayable resin solids content of about 55 percent by weight. The weight ratio of polyester polyol plus poly-results are presented in Table IV below:

TABLE IV

| | Polyester | | Plasticizer | | Coating Properties Sward | | | Humidity |
|---|---|---|---|---|---|---|---|---|
| Example | Example | Amount | Example | Amount | Hardness[1] | 75° F. Bend[1] | 0° F. Bend[1] | Resistance[2] |
| 6 | D | 20 | P | 30 | 18 | Passed | Passed | Good |
| 7 | E | 15 | P | 35 | 8 | Passed | Passed | Good |
| 8 | F | 13 | Q | 35 | 6 | Passed | Passed | Good |
| 9 | G | 18 | Q | 30 | 6 | Passed | Passed | Good |
| 10 | J | 18 | Q | 30 | 10 | Passed | Passed | Good |
| 11 | K | 8 | Q | 40 | 8 | Passed | Passed | Good |
| 12 | L | 20 | P | 30 | 14 | Passed | Passed | Good |
| 13 | M | 25 | P | 25 | 14 | Passed | Passed | Good |

[1]As described in Table I.
[2]Humidity resistance determined by using the coated substrates as the ceiling of a humidity chamber with the coating directed inwardly towards the chamber (QCT chamber). The chamber is heated to 100° F. (38° C.) and about a 9 cm level of water is located 3 to 5 inches below the coated panel, which is sloped.

EXAMPLE 14

A paint was prepared from the following mixture of ingredients:

| Ingredients | Parts by Weight (in grams) |
|---|---|
| Pigment Paste (I)[1] | 400.37 |
| Inhibitor solution[2] | 173.42 |
| Polymeric microparticles[3] | 68.80 |
| Polyester of Example A | 82.06 (90% solids) |
| CYMEL 1130[4] | 149.59 (100% solids) |
| Polyurethane of Example P | 106.85 (70% solids) |
| 40% by weight para-toluenesulfonic acid in isopropanol | 5.23 |

-continued

| Ingredients | Parts by Weight (in grams) |
|---|---|
| Catalyst[5] | 4.48 |

[1] The pigment paste was prepared by grinding TiO$_2$ and polyethylene powder in an iminized polyester grinding vehicle.
[2] Solution of 3.74 parts of cellulose acetate butyrate (CAB), 7.48 parts of TINUVIN 328 (substituted benzotriazole, ultraviolet light absorber, commercially available from Ciba-Geigy), 0.94 parts of silicone fluid in a solvent mixture of 44.37 parts of n-propanol, 26.17 parts of VM & P Naptha, 68.63 parts of 2-ethoxyethylacetate, 33.31 parts of 2-butoxyethylacetate.
[3] Prepared in accordance with Example II of U.S. Pat. No. 4,147,688 and diluted on a 1:1 volume basis with 2-hexoxyethanol.
[4] Mixed methylated, butylated melamine-formaldehyde resin commercially available from American Cyanamid Company.
[5] Dinonylnaphthalenedisulfonic acid, 50 percent neutralized with diisopropylamine, used as a 30 percent by weight solution in a mixture of 52.6 percent isopropyl alcohol, 8.2 percent water and 39.2 percent isobutanol.

The paint prepared from the above-described mixture of ingredients had a sprayable resin solids content of about 55 percent by weight. The weight ratio of polyester polyol plus polyurethane polyol:aminoplast was 1:1 and the weight ratio of polyester polyol plus aminoplast:polyurethane polyol was 3:1.

The paint was sprayed onto a ⅛inch thick RIM thermoplastic polyurethane commercially available from Mobay as TEXIN 3202. The coating was cured at 124° C. for 30 minutes to give a 1.8 mil thick cured coating. The cured coating had a Sward hardness of 18 and withstood a 0° F. cold bend as described above without cracking. The coating exhibited no blistering nor loss of gloss after being subjected to humidity testing for 240 hours in the QCT chamber as described above.

Free films of the resinous ingredients of the example have tensile strengths of 3080 psi and elongations of 47 percent.

EXAMPLES 15-16

Examples 15 and 16 are "clear over color" coating compositions. With these coating compositions, a pigmented or "colored" base coating is applied to the substrate and is overcoated with a clear top coat.

EXAMPLE 15

A pigmented or "colored" base coating composition was prepared from the following mixture of ingredients:

| Ingredients | Parts by Weight (in grams) | Resin Solids |
|---|---|---|
| Pigment paste[1] | 47 | 14 |
| Polyester of Example B | 19 | 16 |
| Polyester[2] | 17 | 10 |
| Polymeric microparticle composition[3] | 71 | 45 |
| Inhibitor composition[4] | 20 | 2 |
| Polyurethane of Example P | 15 | 15 |
| 2/1 volume mixture of methyl amyl ketone and 2-ethoxyethylacetate | 14 | |
| 20% dinonylnaphthalenedisulfonic acid catalyst in n-butylacetate | 3.75 | 0.75 |

[1] The pigment paste was prepared by grinding aluminum pigment in an iminized polyester grinding vehicle.
[2] The polyester was made from 703 parts of 1,6-hexanediol, 482 parts of adipic acid, 821 parts of isophthalic acid and 8.6 parts of hydroxyethylene imine and 442 parts of trimethylolpropane. The polyester was about 59 percent resin solids in 82:18 weight ratio of methyl normal butyl ketone and toluene. The polyester resin had an acid value of 2.3 and an OH value of 89.
[3] Mixture of 23 parts (10 parts solids) of polymeric microparticles prepared in accordance with Example II of U.S. Pat. No. 4,147,688, 13 parts of isopropyl alcohol and 35 parts of CYMEL 1130.
[4] Solution of 2 grams of TINUVIN 328 in 9 grams of methyl amyl ketone and 99 grams of 2-ethoxyethylacetate.

The "clear" coating composition was prepared from the following mixture of ingredients:

| Ingredients | Parts by Weight (in grams) | Resin Solids |
|---|---|---|
| Polyester of Example B | 48 | 41 |
| Inhibitor solution[1] | 27 | 4 |
| CAB solution[2] | 2 | 0.5 |
| Polymeric microparticle composition[3] | 58 | 44 |
| Methyl amyl ketone | 20 | |
| Polyurethane of Example P | 15 | 15 |
| 20% dinonylnaphthalenedisulfonic acid catalyst in n-butylacetate | 3.75 | 0.75 |

[1] Solution of 4 parts of TINUVIN 328 and 11.25 parts of methyl amyl ketone and 11.25 parts of 2-ethoxyethylacetate.
[2] Solution of 3.21 parts of cellulose acetate butyrate in 75/25 (by volume) methyl isobutyl ketone and butanol.
[3] Mixture of 9 parts (4 parts solids) polymeric microparticles prepared in accordance with Example II of U.S. Pat. No. 4,147,688 in 9 parts of isopropyl alcohol and 40 parts of CYMEL 1130.

The paint prepared from the pigmented coating composition had a sprayable resin solids content of about 55 percent by weight. The weight ratio of low molecular weight polyester polyol plus polyurethane polyol: aminoplast was 0.89:1 and the weight ratio of low molecular weight polyester polyol plus aminoplast:polyurethane polyol was 3.4:1. The paint was sprayed onto a ⅛ inch thick RIM thermoplastic polyurethane commercially available from Mobay as TEXIN 3202.

The clear coating composition had a sprayable resin solids content of about 60 percent by weight. The weight ratio of polyester polyol plus polyurethane polyol:aminoplast was 1.4:1, and the weight ratio of polyester polyol plus aminoplast:polyurethane polyol was 5.4:1.

The clear coating composition was spray applied to the colored base coating after flashing the base coating at 20° C. for about 90 seconds, and the composite coating cured at 124° C. for 30 minutes to give a 2.2-2.5 mil thick clear-over-color cured coating.

The cured coating composition had a Sward hardness of 6 and withstood a room temperature and 0° F. cold bend as described above without cracking. The coating exhibited only slight cracking when subjected to humidity testing for 800 hours in the QCT chamber as described above.

EXAMPLE 16

A pigmented or "colored" base coating composition was prepared from the following mixture of ingredients:

| Ingredients | Parts by Weight (in grams) | Resin Solids |
|---|---|---|
| Pigment paste[1] | 47 | 14 |
| Polyester of Example C | 18 | 16 |
| Polymeric microparticle composition[2] | 71 | 45 |
| Inhibitor solution[3] | 20 | 2 |
| Polyurethane of Example P | 28 | 25 |
| 2/1 volume mixture of methyl amyl ketone and 2-ethoxyethylacetate | 14 | |
| 20% dinonylnaphthalenedisulfonic acid catalyst in n-butylacetate | 3.75 | 0.75 |

[1] The pigment paste was prepared by grinding aluminum pigment in an iminized polyester grinding vehicle.
[2] Polymeric microparticle composition as used in Example 15.
[3] Inhibitor composition as used in Example 15.

The "clear" coating composition was prepared from the following mixture of ingredients:

| Ingredients | Parts by Weight (in grams) | Resin Solids |
|---|---|---|
| 2/1 volume mixture of methyl amyl ketone and 2-ethoxyacetate | 40 | |
| Inhibitor solution as used in Example 15 | 20 | 2 |
| Polymeric microparticle composition[1] | 4.5 | 2 |
| CYMEL 1130 | 40 | 40 |
| 25% cellulose acetate butyrate solution as used in Example 15 | 2 | 0.5 |
| Polyurethane of Example P | 28 | 25 |
| Polyester of Example C | 37 | 33 |
| 20% dinonylnaphthalenedisulfonic acid catalyst in n-butylacetate | 3.75 | 0.75 |

[1]Polymeric microparticles prepared in accordance with Example II of U.S. Pat. No. 4,147,688.

The paint prepared from the pigmented coating composition had a sprayable resin solids content of about 55 percent by weight. The weight ratio of polyester polyol plus polyurethane polyol-aminoplast was 1.17:1. The weight ratio of polyester polyol plus aminoplast:polyurethane polyol was 2.04:1. The paint was sprayed onto ⅛ inch thick RIM thermoplastic polyurethane commercially available from Mobay as TEXIN 3202. The coating was flashed at 20° C. for about 90 seconds.

The clear coating composition had a sprayable resin solids content of about 60 percent by weight. The weight ratio of polyester polyol plus polyurethane polyol:aminoplast was 1.45:1, and the weight ratio of polyester polyol plus aminoplast:polyurethane polyol was 2.92:1.

The clear coating composition was then spray applied to the colored base coating after flashing the base coating at 20° C. for about 90 seconds, and the composite coating cured at 124° C. for 30 minutes to give a 2.2–2.5 mil thick clear-over-color composite coating. The final coating had a Sward hardness of 8 and withstood a room temperature and 0° F. cold bend as described above without cracking. After 742 hours of humidity testing in the QCT chamber as described above, only slight cracks were evidenced.

Comparative Examples

A series of coating compositions were prepared with various polyester polyols. The polyester of Example A was compared with similar polyesters in which the hexahydrophthalic anhydride used in Example A was replaced with tetrahydrophthalic anhydride (Example S, Sward Hardness value=50), phthalic anhydride (Example T, Sward Hardness value=58) and adipic acid (Example U, Sward Hardness value=6). The polyesters were combined with a polyurethane polyol plasticizer of Example Q and an aminoplast curing agent and formulated into a coating composition as described generally below. The coating compositions were then applied to an elastomeric substrate and cured and the cured film evaluated for Sward hardness, elongation, tensile strength and 0° F. cold bend.

Coating compositions were formulated as follows:

| Ingredients | Percent by Weight (solids) |
|---|---|
| Polyester of Examples A, S, T, U | 35 |
| Polyurethane of Example Q | 20 |
| CYMEL 303 | 39.5 |
| Para-toluenesulfonic acid | 0.5 |
| Polymeric microparticle[1] | 4.0 |
| Cellulose acetate butyrate | 1.0 |

[1]Prepared in accordance with Example 2 of U.S. Pat. No. 4,147,688 and diluted on a 1:1 volume basis with 2-hexoxyethanol.

The coating composition prepared from the above-described mixture of ingredients had a sprayable resin solids content of about 60 percent by weight. The weight ratio of polyester polyol plus polyurethane polyol:aminoplast was 1.4:1 and the weight ratio of polyester polyol plus aminoplast:polyurethane polyol was 3.7:1.

The paint was sprayed onto a ⅛-inch thick RIM thermoplastic polyurethane commercially available from Mobay as TEXIN 3202. The coatings were cured at 124° C. for 30 minutes to give a 1.8 mil thick cured coating. The properties of the cured coating are shown in Table V below.

TABLE V

| Coating Prepared With the Polyester of | Sward Hardness | Percent Elongation | Tensile Strength in psi | 0° F. Bend |
|---|---|---|---|---|
| Example A | 28 | 54 | 4118 | Pass |
| Example S | 26 | 53 | 4260 | Pass |
| Example T | 38 | 25 | 5680 | Small cracks |
| Example U | 10 | 45 | 2130 | Pass |

The results reported in Table V show the preference of the cycloaliphatic moieties, i.e., hexahydrophthalic anhydride and tetrahydrophthalic anhydride compared to the aromatic and acyclic dicarboxylic acids. In comparison with the aromatic dicarboxylic acid, the cycloaliphatic materials have superior elongations and low temperature flexibility. Both the cycloaliphatic and the aromatic dicarboxylic acids are superior to the acyclic materials in terms of hardness and tensile strength.

The coating composition of Example 10 in U.K. Pat. No. 1,477,008 was prepared. When the coating composition was applied to a substrate and cured, it was found to have an elongation of 180 percent and a tensile strength of 3976 psi. In addition, when applied to an elastomeric substrate and tested for resistance to cold bending, it was found to pass the 0° F. cold bend. The Sward hardness of the coating was 26. However, the coating composition was of the low solids type, having a sprayability of only 23 percent.

What is claimed is:

1. A thermosetting, elastomeric coating composition sprayable at resin solids content of at least 40 percent by weight and being flexible such that when the coating composition is deposited on an elastomeric substrate and cured, the coated substrate can be bent around a ¼-inch mandrel with the coating facing outwardly and the coating exhibits no breaks or cracks when tested at 70–75° F., comprising as the film-forming constituents:

(A) a hard polyester polyol having at least 20 percent by weight cyclic moieties and the percentage of cyclic moieties being not greater than that required to achieve said flexibility, having a hydroxyl value of at least 80 and the hydroxyl value being not greater than that required to achieve said flexibility, a molecular weight of 300 or greater but not greater than that required for formulating said coating composition with a sprayability of at least 40 percent by weight, and said polyester polyol having a Sward Hardness value of at least 15, (B) a polyurethane polyol having a molecular weight of 2,000 or greater but not greater than that required for formulating said coating composition with a sprayability of at least 40 percent by weight, and said polyurethane polyol having a Sward Hardness value of less than 10, and (C) a curing agent capable of reacting with the active hydrogens in (A) and (B) to form a crosslinked coating selected from the class consisting of aminoplast and polyisocyanates; the difference in Sward Hardness values between (A) and (B) being greater than 10; the ratio of (A)+(B):(C) being within the range of 5 to 0.5:1; the weight ratio of (A)+(C):(B) being within the range of 100 to 1:1.

2. A thermosetting, elastomeric coating composition sprayable at resin solids content of at least 45 percent by weight and being flexible such that when the coating composition is deposited on an elastomeric substrate and cured, the coated substrate can be bent around a ¼-inch mandrel with the coating facing outwardly and the coating exhibits no breaks or cracks when tested at 70–75° F., comprising as the film-forming constituents:

(A) a hard polyester polyol having 20 to 70 percent by weight cyclic moieties and 15 to 80 percent by weight neopentyl moieties, said polyester having a hydroxyl value of 200 to 350, a molecular weight of 300 or greater but less than 1000, and a Sward Hardness value of 20 to 40, (B) a polyurethane polyol having a molecular weight of 2,000 to 10,000 and a Sward Hardness value of less than 10, and (C) a curing agent capable of reacting with the active hydrogens in (A) and (B) to form a crosslinked coating selected from the class consisting of aminoplast and polyisocyanates;

the difference in Sward Hardness values between (A) and (B) being within the range of 20 to 40 inclusive; the ratio of (A)+(B):(C) being within the range of 2 to 1:1; the weight ratio of (A)+(C):(B) being within the range of 9 to 1:1.

3. The coating composition of claims 1 or 2 sprayable at a resin solids content of 45 to 65 percent by weight.

4. The coating composition of claim 1 comprising 20 to 70 percent by weight cyclic moieties.

5. The coating composition of claims 1 or 4 in which the cyclic moieties are cycloaliphatic.

6. The coating composition of claim 1 in which the polyester contains neopentyl moieties.

7. The coating composition of claims 1 or 2 in which the polyester polyol is formed from reacting a cycloaliphatic dicarboxylic acid or its functional equivalent thereof with a polyol containing neopentyl groups.

8. The coating composition of claim 7 in which the cycloaliphatic dicarboxylic acid is selected from the class consisting of hexahydrophthalic acid and dimethylcyclohexane dicarboxylic acid or their functional equivalents thereof.

9. The coating composition of claim 7 in which the polyol containing neopentyl group branching is selected from the class consisting of 2,2-dimethyl-3-hydroxypropyl 2,2-dimethyl-3-hydroxypropionate and neopentyl glycol.

10. The coating composition of claim 1 in which the polyester polyol has a molecular weight of 1000 or less.

11. The coating composition of claims 1 or 2 in which the aminoplast is a melamine-, urea- or benzoguanamineformaldehyde condensate etherified with an alcohol containing 1 to 4 carbon atoms including mixtures of such alcohols.

12. The coating composition of claims 1 or 2 in which the polyisocyanate is a blocked polyisocyanate.

13. The coating composition of claims 1 or 2 in which the polyurethane polyol is a polyester-polyurethane polyol.

14. The coating composition of claims 1 or 2 in which the polyurethane polyol has a molecular weight less than 5000.

15. A coated article coated with the coating composition of claims 1 or 12.

16. The coated article of claim 15 which has a colored base coat and a clear top coat.

* * * * *

UNITED STATES PATENT AND TRADEMARK OFFICE
CERTIFICATE OF CORRECTION

PATENT NO. : 4,419,407
DATED : December 6, 1983
INVENTOR(S) : Robert M. Piccirilli et al It is certified that error appears in the above-identified patent and that said Letters Patent are hereby corrected as shown below:

Column 24, line 39, "12" should be --2--.

Signed and Sealed this

Seventeenth Day of April 1984

[SEAL]

Attest:

GERALD J. MOSSINGHOFF

Attesting Officer     Commissioner of Patents and Trademarks